UNITED STATES PATENT OFFICE.

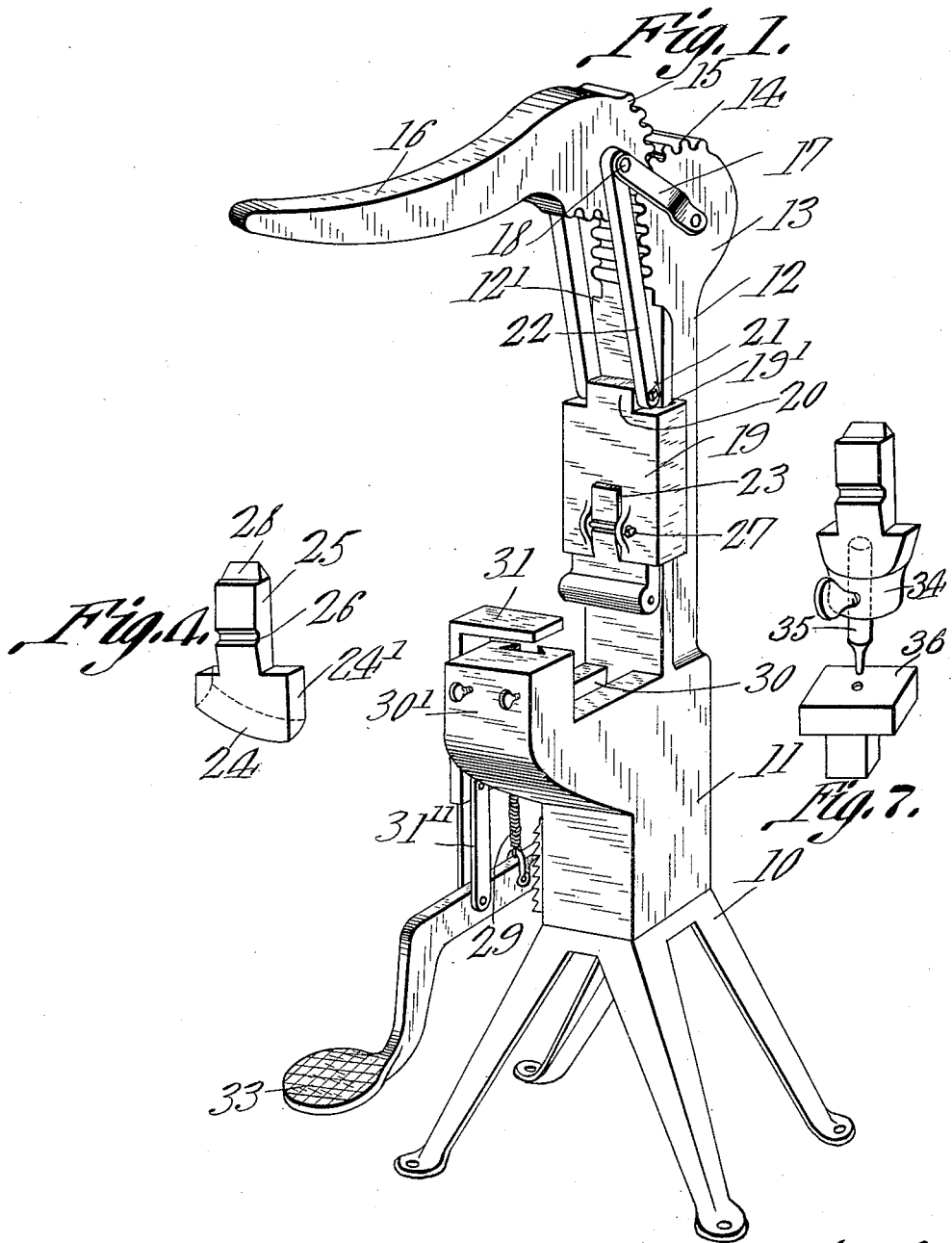

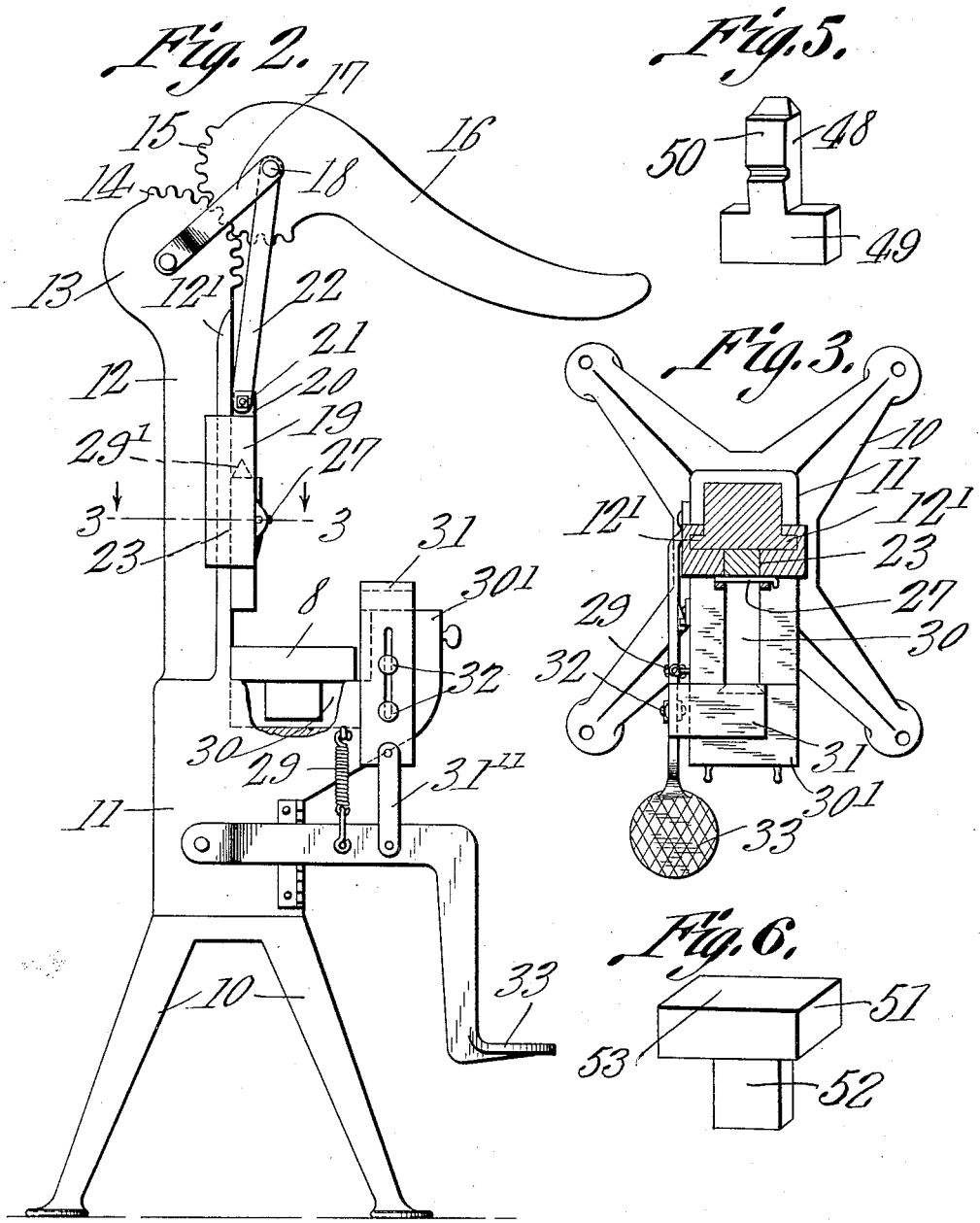

FREDERICK WILLIAM MILEK, OF STURGIS, SOUTH DAKOTA.

METAL-WELDING MACHINE.

1,041,838.  Specification of Letters Patent.  Patented Oct. 22, 1912.

Application filed May 12, 1911. Serial No. 626,835.

*To all whom it may concern:*

Be it known that I, FREDERICK WILLIAM MILEK, a citizen of the United States, residing at Sturgis, in the county of Meade and State of South Dakota, have invented a new and useful Metal-Welding Machine, of which the following is a specification.

This invention relates to an improvement in metal welding machines.

The primary object of said invention is to provide a welding and sharpening device which may be conveniently manipulated by hand.

A further object of the invention is to so construct the machine that the hammer and anvil may be interchanged in order to accommodate different kinds of work. While the device is primarily intended for welding toes and heels on horse-shoes, the same is also adapted for welding springs and plow shares and for punching holes in plate and strap iron of ordinary sizes, in fact the same may be employed to handle a great variety of work, the dies and hammers as before stated being readily interchanged.

In the drawings: Figure 1 is a perspective view of the machine. Fig. 2 is a side elevation. Fig. 3 is a section on the line 3—3 of Fig. 2. Fig. 4 is a similar view of a die or plunger employed in welding plow shares. Fig. 5 is a perspective view of a die or hammer which is employed in welding springs. Fig. 6 is a perspective view of one type of removable anvil. Fig. 7 shows the die and plunger used in punching plate and strap iron, there being various sizes of punches to be inserted in the plunger and various dies or anvils to correspond to said punches.

In the drawings 10 designates a pedestal or support on which is mounted the bed or base 11 of the machine. This base is formed with the vertically extending reduced arm 12, which terminates in the rounded enlargement 13 which is formed with a segmental gear 14 in mesh with the segmental gear 15 of an actuating lever 16 said lever being connected to the enlargement 13 by means of links 17, a pin 18 passing centrally through the enlargement 15, said links 17 being secured to said pin. The reduced extension 12 is formed with guides 12′ which prevent the displacement of a vertically movable hammer 19, the wings or extensions 12′ extending within the channels 19′ formed in the hammer. The upper end of the hammer is formed with a reduced extension 20 through which extends a pin 21, this extension 20 being equal in length to the thickness of the actuating lever 16, a plurality of links 22 being arranged on either side of said lever and secured to the pin 18, being likewise secured to the pin 21. Thus as the lever 16 is manipulated the hammer 19 will be raised and lowered. The hammer is cut away centrally to form the vertically disposed recess 23 which receives the shank of one of the die members, ears being formed integral with said hammer, said ears extending parallel with the side walls of said cut away portion. The body portion of the member 11 is provided on its upper face with the slot 30 which receives an anvil such as shown in Fig. 6, the work resting on said anvil in the path of movement of the hammer.

A clamp 31 extends parallel with the angular extension 30′ formed integral with the member 11, said clamp being substantially L-shaped, its shank portion being slotted to receive guide screws 32, a plurality of links 31′ connecting said shank with a treadle 33, said treadle when depressed drawing the clamp toward the angular extension formed integral with the member 11 against the tension of the spring 29′ which is secured to said extension at one end and to the said treadle at the other end, a rack being arranged on the base in the line of travel of said treadle, said treadle being formed with an offset lip for contact with said rack. Thus the treadle may be depressed and by exerting a slight lateral movement, the same may be held against upward movement by said rack. Thus in the welding of horse-shoes a portion of the shoe is allowed to rest on the member 11, being securely clamped by the member 31.

In Fig. 7 is shown a plunger 34 to be inserted in the slotted portion of hammer 19, and in the lower portion of the said plunger is a punch 35 held within the said plunger 34 by means of a thumb screw. The anvil 36 contains a hole in its top surface to correspond with the punch to be inserted in plunger 34, the said plunger 34, punch 35, and anvil 36 being used in conjunction to punch holes in strap or band iron, there being various anvils containing holes varying in size according to the punch used and the hole to be punched. It will be noted that the hammer may be provided with various types of dies which coact with an anvil member to weld either plow shares or springs. In the welding of plow shares the hammer is provided with a die 24 such as is shown in Fig. 4 and in welding springs the die 48 shown in Fig. 5 is employed, said die being formed with the rectangular head 49 and the shank portion 50 which extends within the slot formed in the hammer.

The die 51 shown in Fig. 6 is provided with a stem 52 adapted to extend within the slot 30, being formed with the rectangular head 53 which when the stem is inserted in said slot extends from the arm 12 to the off-set 30' entirely covering the slot 30 and the adjacent portion of the pedestal 11.

The many uses for which such a machine can be put will be clearly apparent and particular attention is called to the peculiar construction of the hammer which permits of the ready insertion of the various die members. Attention is called also to the upper face of the member 11 which receives and permits the adjustment of various types of anvils. The right angular extension which is formed integral with the member 11 being constructed to support an anvil or female die member, a clamp being provided for holding the work while the hammer is actuated. Attention is called to the fact that various sizes of holes can be punched in plate, band or strap iron, with ease and rapidity. Attention is further called to the fact that a machine of this character will be economical to manufacture, the various parts being such as may be readily assembled, the peculiar arrangement of the hammer actuating means being such that the hammer may be conveniently operated by hand. Attention is called to the fact that this hammer is of such weight as to strike an effectual blow regardless of the pressure exerted on the lever 16, in handling light work the weight of the hammer alone being sufficient without excessive pressure being exerted on the lever 16. However in heavy work pressure may be exerted on the lever 16 and this combined with the weight of the hammer exerts a blow sufficient to properly weld the materials.

What is claimed is:—

1. In a welding machine, a supporting base, a vertically extending arm formed integral with said base, said arm terminating in an enlargement, said enlargement being formed with a segmental gear, a hammer mounted for vertical movement on said arm, a lever, said lever being formed with a segmental gear in mesh with the first mentioned gear, link connections between said lever and the enlarged portion of said arm, and a link connection between said lever and said hammer.

2. In a metal welding machine, a supporting base, a vertically extending arm formed integral with said base, said arm terminating in a round enlargement, said enlargement being formed with a segmental gear, a lever having a link connection with the enlargement, said lever being formed with a gear meshing with the first mentioned gear, said arm being formed with laterally extending guides, a hammer mounted for vertical movement on said arm, said guides entering channels formed in said hammer and a link connection between said hammer and said lever.

In testimony that I claim the foregoing as my own, I have hereto affixed my signature in the presence of two witnesses.

FREDERICK WILLIAM MILEK.

Witnesses:
J. K. GRUBB,
EDMUND H. SWEET.

Copies of this patent may be obtained for five cents each, by addressing the "Commissioner of Patents, Washington, D. C."